United States Patent [19]

Mogami et al.

[11] Patent Number: 5,571,413
[45] Date of Patent: Nov. 5, 1996

[54] COMPOSITE FILTER MATERIAL

[75] Inventors: Yoshiaki Mogami; Akira Moriya, both of Okayama, Japan

[73] Assignee: Junkosha Company Ltd., Tokyo, Japan

[21] Appl. No.: 80,022

[22] Filed: Jun. 18, 1993

[30] Foreign Application Priority Data

Jun. 22, 1992 [JP] Japan .................................. 4-187583

[51] Int. Cl.⁶ ............................................. B01D 29/00
[52] U.S. Cl. ................... 210/489; 210/490; 210/500.27; 210/500.1; 210/500.36
[58] Field of Search ..................................... 210/489, 490, 210/500.27, 496, 500.1, 500.36, 497.01, 497.1, 503, 505, 508; 428/311.5; 156/155

[56] References Cited

U.S. PATENT DOCUMENTS

| | | | |
|---|---|---|---|
| 4,101,423 | 7/1978 | Merrill et al. | 210/497.1 |
| 4,740,413 | 4/1988 | Wildner | 210/500.36 |
| 4,931,178 | 6/1990 | Manniso et al. | 210/230 |
| 4,983,434 | 1/1991 | Sassa | 210/505 |
| 5,057,217 | 10/1991 | Lutz et al. | 210/346 |
| 5,108,474 | 4/1992 | Riedy et al. | |
| 5,130,024 | 7/1992 | Fujimoto et al. | 210/500.36 |
| 5,258,127 | 11/1993 | Gsell et al. | 210/497.01 |

FOREIGN PATENT DOCUMENTS

| | | |
|---|---|---|
| 395331 | 4/1990 | European Pat. Off. . |
| 9006846 | 6/1990 | WIPO . |
| 108829 | 12/1990 | WIPO . |
| 211924 | 1/1992 | WIPO . |

*Primary Examiner*—Ana Fortuna
*Attorney, Agent, or Firm*—Gary A. Samuels

[57] ABSTRACT

A layered composite material for filtration having a filter layer, a buffer layer, and a support, layer. The buffer layer is a material more compressible and extensible than the support layer and imparts strength and durability to the composite material.

4 Claims, 1 Drawing Sheet

COMPOSITE FILTER MATERIAL

FIELD OF THE INVENTION

This invention is directed to a composite article for filtration. In particular, this invention is directed to a layered composite material for use in liquid filtration equipment.

BACKGROUND OF THE INVENTION

Filter materials of woven cloth, mesh, or felts for use in industrial liquid filtration equipment such as filter presses, rotary drum filters, traveling-belt filters, etc., are well known in the art. The filter materials described above are often used with a pre-coat of diatomaceous earth, perlite, cellulose fibers, gypsum, and the like, in order to accomplish optimum filtrate clarification, reduce the risk of blinding of the filter cloth, and to provide a renewable filter medium which permits longer periods of operation.

Important properties desired of filter materials are particle retention on the surface (vs. in depth), high flow rates, good filter-cake release, resistance to blinding, ease of cleaning (vs. the need for disposal of precoat media), maximum filtrate clarity, and minimal filter-cake contamination. Also important are strength, durability, and dimensional stability for the equipment and process conditions, and chemical stability for the process.

Whether or not such filter materials are used with or without a precoat, difficulties can be encountered in satisfying the often antithetical properties desired of them. For example, when used without a precoat, to obtain clear filtrate from a feed containing fine particles the filter cloth or felt must be quite tight and dense at the expense of filtration rate, cake-release properties, and blinding resistance. Furthermore, cleaning or removal of particles trapped in the filter material is time consuming, expensive, and frequently ineffective. When a filter aid precoat is used filtration rate, filtrate clarity, resistance to blinding, length of operation, and filter-cake removal can be significantly improved, however, other problems can be encountered. The precoating of a filter aid on the filter material is an extra step, requiring additional materials, methods, and equipment. Also, the filtered particles can become mixed with or contaminated by the filter aid which can lead to difficulty and expense in separating and recovering them, or may require an additional waste disposal operation.

To overcome some of these problems, surface filtration materials and techniques have been developed. In some cases surface filtration materials are the same materials described above which have been modified to alter their surface porosity, for example, by flattening the surface with heat treatments or pressing. More often, surface filtration materials include a microporous filtration membrane laminated to a support or backing material. The surface filtration membranes provide high filtration rates, good filtrate clarity, good filter-cake release, and resistance to blinding. They are, however, relatively fragile and can be physically damaged by methods used for cleaning and cake removal such as scraping, liquid sluices or rinses, fluid flow back-pulsing or other flow interruption methods, and the like. As a result surface filtration materials often have shorter service lives, or, have their effectiveness limited by operational compromises required to extend their service life.

Surface filtration membranes may be selected from a variety of porous plastic materials including polyolefins, polyurethanes, polyesters, polyamides, fluoropolymers, and other synthetic polymer materials. The membranes are laminated to support materials to help them withstand the rigors in use and handling associated with the equipment and processes in which they will be used. Support materials are typically textile felts or woven fabrics which are laminated to the membranes by methods well known in art, such as with adhesives, direct heat-bonding of the layers, etc.. The felts and fabrics used for support may be made of the same organic polymers listed above, or of inorganic materials such as fiberglass, ceramic fibers, and the like.

SUMMARY OF THE INVENTION

This invention provides a layered composite material for liquid filtration that has excellent filtration efficiency and filter-cake release properties over long periods of use and, furthermore, is resistant to damage, thus providing exceptional durability during handling and use.

The invention provides a composite filter material comprising layers in the sequence of:
 (a) a porous support layer of a woven sheet of synthetic polymer fibers,
 (b) a porous buffer layer, more extensible and compressible than the support layer, of a non-woven sheet of synthetic polymer fibers, and
 (c) a filtration layer of porous polytetrafluoroethylene membrane.

In one embodiment the support layer is adhered to one surface of the buffer layer, and the filtration layer is adhered to the other surface.

In another embodiment the filtration layer is adhered to one surface of the buffer layer, and the assembly thus formed is joined and sealed to the support layer at the edges only.

DETAILED DESCRIPTION OF THE INVENTION

Figure 1A:
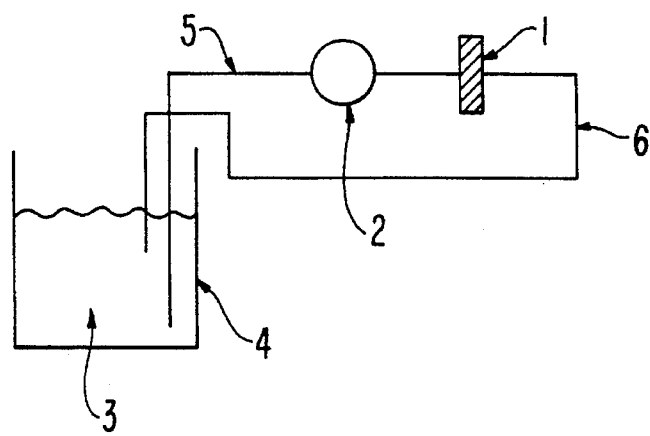
FIG. 1(a) schematically depicts the test apparatus of the Flow Durability Pressure Test.

The filter layer is a porous film or membrane of a synthetic polymer having a nominal pore size in the range 0.01 to 50 micrometers, a thickness in the range 20 to 500 micrometers, and a pore volume in the range 50 to 98 percent. The porous membrane can be made from any of a variety synthetic polymers, including, for example, polyolefin, polycarbonate, polyurethane, polyvinyl chloride, polyester, polyamide, and fluoropolymer. Preferred, for their chemical inertness, release properties, and strength are porous films of fluoropolymers, such as polytetrafluoroethylene (PTFE), ethylene/tetrafluoroethylene copolymer (ETFE), polyvinylidene fluoride (PVDF), tetrafluoroethylene/hexafluoropropylene copolymer (FEP), and tetrafluoroethylene/(perfluoroalkyl) vinyl ether copolymer (PFA). Most preferred is a porous membrane of expanded polytetrafluoroethylene having a structure of interconnected nodes and fibrils and made according to U.S. Pat. No. 3,953,566.

Porous membranes of hydrophobic polymers such as fluoropolymers, polyolefins, etc., which resist penetration and passage of water through them, can be given hydrophilizing treatments so that they can be effectively used as filter materials in aqueous liquid systems. Conventional methods in which the inner surfaces of the pores in the porous membranes are coated with a hydrophilizing agent, such as a surfactant, can be used. Another suitable hydrophilizing agent which can be used is described in U.S. Pat. No. 5,130,024, incorporated herein by reference. The agent is a hydrophilic copolymer made by copolymerizing a fluorine-containing ethylenically unsaturated monomer and a non-fluorinated vinyl monomer containing a hydrophilic group.

The buffer layer is a porous layer of material of synthetic polymer fibers interposed between and adhered to the filter layer on one side and to the support layer on the other side. By dint of its physical properties and method of attachment to the filter and support layers the buffer layer enhances cake-release from the filter layer and reduces damage to the filter layer thus significantly increasing the effective service life of the material. For example, the compressibility/extensibility properties of the buffer layer are important in that they provide the ability to absorb and distribute the shocks, vibrations, and stresses to the filter layer such as are imparted by mechanical scraping, liquid sluices or rinses, and liquid back-pulsing during cleaning or cake-removal sequences.

The buffer layer can be a felt cloth of synthetic polymer fibers or, preferably, a non-woven cloth of synthetic polymer fibers. The fibers can be selected from among a number of polymers including polyethylene, polypropylene, or other polyolefins, as well as polyamide, polyester, polyurethane, polyvinyl chloride, polytetrafluoroethylene or other fluoropolymers; so long as they can be formed into a material having the requisite properties. Preferably the fibers are a polyolefin, most preferably polypropylene fibers.

The buffer layer material should have a nominal pore size in the range 10 to 1000 micrometers, preferably in the range 50 to 500 micrometers; and a pore volume in the range 30 to 98 percent, preferably 50 to 98 percent. The buffer layer material should have a thickness in the range 0.1 to 10 millimeters, preferably 0.1 to 3 millimeters; and a weight in the range 10 to 500 g/m$^2$, preferably 20 to 300 g/m$^2$, more preferably 20 to 100 g/m$^2$.

Pore size values given for the buffer layer material are approximate values only due to the irregular structure of the material. They are obtained by microscopic examination of the material surface and measurement of the distance between fibers at the surface.

The buffer layer material must have, in the z-direction i.e., the direction normal to the plane of the layer, a lower secant tensile modulus of elasticity and lower secant compressive modulus of elasticity than the material of the support layer. That is to say that the material of the buffer layer can be stretched or compressed a given percentage of its initial dimension by application of less force than is required to stretch or compress the material of the support layer the same percentage of its initial dimension. For purposes herein, material having the tensile and compressive characteristics defined above may be referred to as being more compressible and more extensible than the material to which it is compared.

The buffer layer should be sufficiently compressible such that by application of a 1.0 kg/cm$^2$ compressive load to its surface it is compressed an amount in the range 5 to 50 percent, preferably 20 to 40 percent, of its original thickness. In the planar direction of manufacture (machine-direction) and in the planar direction transverse to the direction of manufacture (transverse-direction), the buffer layer material should be sufficiently extensible such that by application of a 1.0 kg/cm$^2$ tensile stress to a 1 millimeter thick sample, the material is stretched an amount in the range 0.1 to 20 percent or more, preferably 2 to 10 percent, of its original length.

The support layer is a porous material much stiffer and more resistant to dimension change than the buffer layer material. The support layer material can be a woven or non-woven sheet synthetic polymer fibers having a tensile strength in the range 20 to 800 kg/3 cm-width. By woven sheet as used herein is meant material fabricated in conventional textile fabric forms as well as relatively open networks or mesh formed of woven fibers. The fibers can be monofilaments or in multifilament yarn form, the fibers having diameters in the range 1 to 2000 micrometers, preferably 10 to 800 micrometers. The thickness of the support layer is in the range 0.1 to 10 millimeters, preferably 0.5 to 3 millimeters. The support layer material can be made from any of a variety of synthetic polymers, including, for example, polyolefin, polycarbonate, polyvinyl chloride, polyester, polyamide, and fluoropolymer, and is selected according to the strength, chemical resistance, and heat resistance required for an application. Preferably the support layer material is a woven sheet of polyolefin fibers, more preferably polypropylene fibers.

Lamination of the layers to form the composite material of the invention is accomplished by adhering the layers in a manner in which good interlayer adhesion is achieved and surface area blinded by bond sites is minimized. Interlayer adhesion strength should be 100 g/3 cm-width or greater as determined by standard peel test methods. Bond sites should occupy 50 percent or less, preferably in the range 2 to 20 percent, of the surface area.

Lamination of the layers may be done using conventional methods, equipment, and materials well known in the art, for example, adhesives may be used. Suitable adhesive materials may be found in, but not limited to, the classes consisting of thermoplastics, thermosets, or reaction curing polymers. The adhesives may be applied to the surfaces of the materials to be laminated, for example, by printing, coating, or spraying methods; and the materials joined using standard lamination equipment.

A preferred method of lamination of the layers is to adhere the layers using thermal fusion techniques whereby primary and secondary interlayer bond sites are developed. A primary bond site as used herein is a bond site at which all three layers are adhered together, and which is continuous through the buffer layer material. A secondary bond site as used herein is a bond site at which two layers are adhered at a surface region only, for example, at a location where a surface fiber of the buffer layer material contacts an adjacent surface of the filter layer or support layer, and is not continuous through the buffer layer material. The distance between neighboring primary bond sites should be 5 millimeters or less, and between secondary bond sites should be 1 millimeter or less, preferably 0.2 millimeter or less.

The secondary bond sites are located in the spaces or intervals between the primary bond sites, affect only the surface regions of the respective layers, and thus, have little influence on the compressibility and extensibility of the buffer layer material, but are remarkably effective in increasing the interlayer adhesion strength of the composite filter material. The secondary bond sites, due to their frequency and location, are also highly effective in spreading and distributing shocks and stresses delivered to the filter membrane and passing them to the compressible and extensible buffer layer material, thus cushioning and preventing damage to the filter layer material. By the same token, secondary bond sites at the buffer layer/support layer interface spread and distribute shocks and stresses delivered to the buffer layer by the support layer and, because the buffer layer material is more compressible and extensible than the support layer material, the shocks and stresses are substantially prevented from affecting the filter layer.

Lamination of the layers by thermal fusion is effected by simultaneous application of heat and pressure to the materials to be joined. This can be done using conventional equipment, for example, with heated platen presses, or by nipping the materials between a heated metal-surface roll and a silicone rubber-surface roll, or the like. Higher pressure is applied to the materials at selected locations to produce primary bond sites, at which fused material is continuous through the buffer layer. This can be done by utilizing the characteristics of the woven support layer material. For example, the woven support layer material can have a weave pattern that produces high spots at regular intervals over its surface. As the layered materials are pressed between the platens or rolls, the high spots of the woven support layer material compress the more compressible material of the buffer layer to a greater extent than at adjacent areas and a primary bond site of fused material, continuous through the buffer layer, is formed. At the same time, secondary bond sites are formed in areas between the primary bond sites where less compressive force is applied. Alternatively, when laminating support layer material having relatively flat surfaces without high spots, roll or platen surfaces having protruding points or other raised areas can be used to form the primary bonds sites.

The embodiment described above comprises a composite filter material in which the surface of each layer is adhered to the surface of the adjacent layer. In a second embodiment, the filter layer and the buffer layer are laminated and adhered as described above, thus forming an assembly. The assembly is then joined and sealed to the support layer at the edges only. The assembly and support layer can be joined and sealed at their edges with adhesives or by thermal fusion, for example, by flame bonding; or by other methods known in the art. This embodiment provides a space between the support layer and the buffer layer which is useful in evenly distributing the pressure resulting from backflow of air or liquid to promote filter cake-release from the surface of the filter layer.

TEST METHODS

Flow Durability Pressure Test

This test quickly determines the durability of filter materials challenged by a high pressure pulsed-flow of water. The test apparatus is shown schematically in FIG. 1(a) and the test pressure cycle illustrated in FIG. 1(b).

Figure 1B:
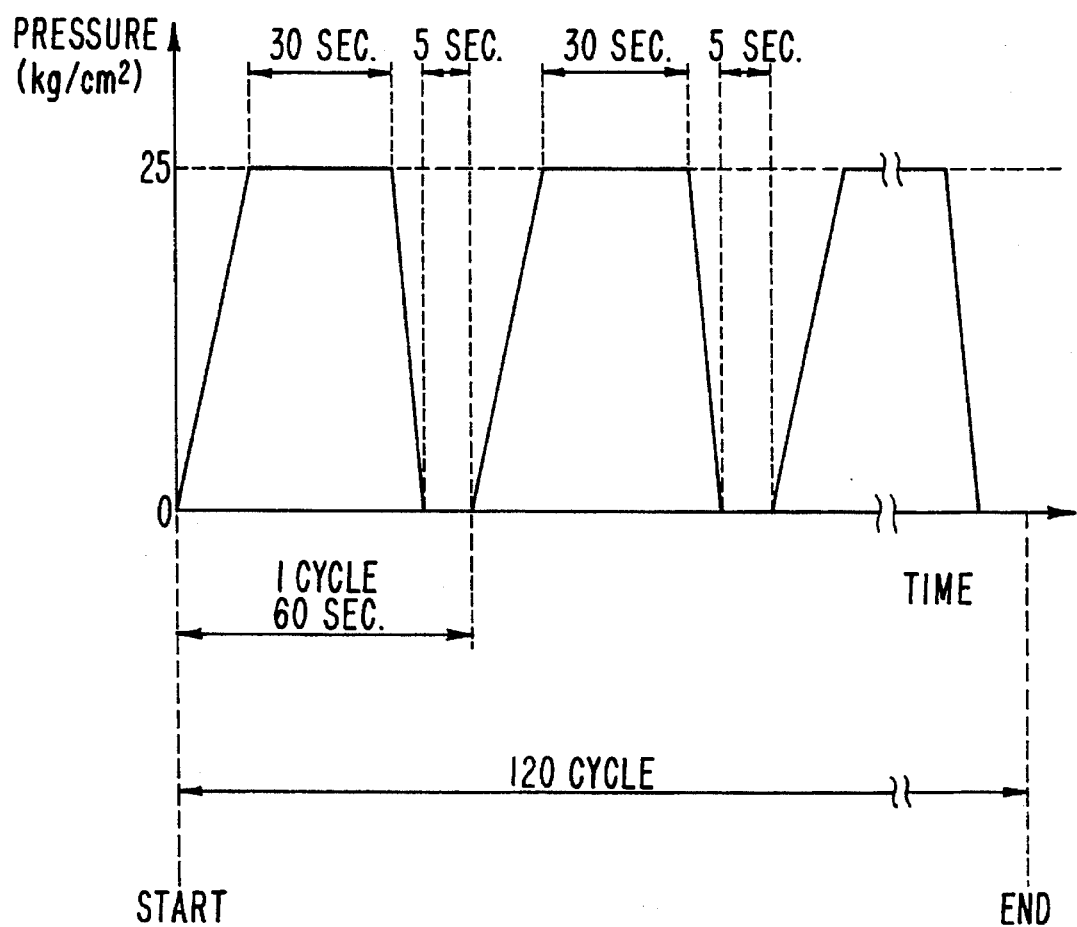
FIG. 1(b) depicts the test cycle of the Flow Durability Pressure Test.

Referring to FIG. 1(a), a test specimen is mounted in a standard 47 mm filter holder 1. The filter holder inlet is connected to a high pressure pump 2 (Model LS-47HP, made by Advantec Co.). Water 3 is drawn by the pump from a reservoir 4 through inlet tubing 5. The water is pumped, at a selected test pressure, through the test specimen. Connected to the outlet of the filter holder 1 is return tubing 6 which carries the water back to the reservoir 4 for recirculation.

For interrupted-flow durability testing the test specimen is mounted in the filter holder so that the filter layer is on the upstream (high pressure) side. The pump is operated in a manner to provide a 60 second test cycle during which water flow through the specimen occurs for 55 seconds. Delivered water pressure is increased to 2.45 MPa (25 kg/cm$^2$), maintained at that level for 30 seconds, and then reduced to 0 gauge pressure so that no water flows for 5 seconds. The test cycle is graphically depicted in FIG. 1(b).

The test is continued until 120 cycles are completed, after which the sample is removed for examination. During the test the water temperature rises into the range 40° C. to 60° C. due to heat generated by the pump.

Filtration Test

In this test the filter material is challenged with an aqueous suspension containing 2 weight percent titanium dioxide particles having a nominal particle size of 0.45 micrometers.

The test apparatus consists of a 5-plate laboratory filter press in which five 10 cm×10 cm specimens of the filter material are mounted. A diaphragm pump pumps the test liquid through the filter press. Filtration is stopped periodically for filter cake removal and visual inspection of the filter material. Filtration rate and filtrate clarity are also measured at these intervals, shortly after filtration has been started.

Filtrate flow rate is measured at intervals by collection of the filtrate for a period of 60 seconds. Turbidity measurements of the filtrate are made at the same intervals to determine filtrate clarity.

EXAMPLE 1

A layered composite filter material of the invention was prepared as follows:

A porous expanded polytetrafluoroethylene film having a nominal pore size of 0.2 micrometers, a thickness of about 40 micrometers, and a pore volume of about 85 percent was used as the filter layer.

A polypropylene, spun-bonded non-woven cloth (Type D28, manufactured by Fukusuke Co.) was used as the buffer layer. The non-woven cloth consisted of polypropylene filaments having a core with a melting point of about 180° C. and a surface layer with a melting point of about 175° C., melt-bonded at the surface layer of contacting filaments. The non-woven polypropylene cloth had a weight of about 28 g/m$^2$, a thickness of about 1 millimeter, and a pore volume of about 97 percent.

A woven fabric, woven in both machine direction and transverse direction with multifilament polypropylene yarn was used as the support layer. The woven fabric had a thickness of about 1 millimeter, and air permeability of 13 cc/cm$^2$/sec. Machine direction tensile strength was 310 kg/3 cm-width; transverse direction tensile strength was 160 kg/3 cm-width.

The layers were laminated together using thermal fusion by passing them through the nip of a heated metal-surface roll and a silicone rubber-surface roll. The expanded polytetrafluoroethylene film of the filter layer contacted the heated roll surface. The heated roll was at a temperature of about 180° C., line speed was about 6 meters/minute, and the nip pressure was about 294 kPa (3 kg/cm$^2$). The distance between neighboring points of adhesion on the adhered surfaces of the filter layer and buffer layer was 0.2 millimeter on average, and in no case exceeded 0.5 millimeters. The adhesion strength between the filter layer and the buffer layer was about 250 g/3 cm-width, and that between the buffer layer and the support layer was about 150 g/3 cm-width.

COMPARATIVE EXAMPLE 1

A conventional surface filtration material in which a surface filtration membrane is directly laminated to a support layer material was prepared for comparison with the article of the invention described above in Example 1.

The comparative filtration material consisted of the materials of the filter layer and support layer of Example 1 and was laminated as described in Example 1 to form a 2-layer surface filtration material having no buffer layer between the filter layer and support layer.

The filtration articles of Example 1 and Comparative Example 1 were given hydrophilizing treatments in order to test them using aqueous liquids. The articles of Example 1 and Comparative Example 1 were coated with a 1% solution of a hydrophilic copolymer (copolymer of 80 mol % polyvinyl alcohol/20 mol % tetrafluoroethylene) in a solvent mixture. The solvent mixture consisted of 4 parts (by weight) methyl alcohol to 1 part ethyl alcohol.

Material from the articles of Example 1 and Comparative Example 1 were given the Flow Durability Pressure Test as described above. Examination of the material after the test indicated that the article of Example 1 sustained no damage whatsoever. The article of Comparative Example 1, on the other hand, had been forced into the depressions of the woven support layer, had more than 50 pinholes in the area tested (about 17 cm$^2$), and was no longer suitable for filtration use.

Material from the articles of Example 1 and Comparative Example 1 were then subjected to the Filtration Test as described above. Initially, filtrate clarity in both tests was in the range 20 ppm particles or less, and the flow rates were substantially the same. However, by the time 50 hours of testing were completed significant differences in filtrate clarity and filtrate flow rate existed between the two materials. The results are shown in Table 1 and Table 2.

TABLE 1

| | Filtration Rate (m3/m2/hr) Time of Test (hrs) | | | | |
|---|---|---|---|---|---|
| | 50 | 100 | 200 | 400 | 500 |
| Example 1 | 1.4 | 1.4 | 1.4 | 1.4 | 1.4 |
| Comp. Example 1 | 1.1 | 1.0 | 0.9 | 0.9 | 0.8 |

TABLE 2

| | Clarity (ppm) Time of Test (hrs) | | | | |
|---|---|---|---|---|---|
| | 50 | 100 | 200 | 400 | 500 |
| Example 1 | 10 | 10 | 10 | 10 | 10 |
| Comp. Example 1 | 100 | 100 | 110 | 120 | 130 |

Filtration was temporarily stopped for filter cake removal at each time interval shown in Tables 1 and 2. Each time filtration was stopped it was noted that the filter cake released completely from the surfaces of both materials tested. However, the surface of the material of Comparative Example 1 was damaged. Examination of the surface of the material of Comparative Example 1 revealed pinholes in the surface, as well as areas of delamination where the filter layer was peeling from the support layer. Furthermore, the data in Tables 1 and 2 indicate a substantial loss in flow rate through the material of the comparative example, and a significant loss in clarity of the filtrate passed through the material of the comparative example. The deterioration in filtration performance of the material of the comparative example is felt to be attributable to the damage observed in the material. Some of the particles passing through the pinholes in the surface will also pass through the support layer, thus causing a loss in clarity of the filtrate. At the same time, particles will accumulate in the support layer and begin blinding the support layer thereby causing a loss in filtrate flow rate.

Examination of the layered composite filter material of the invention of Example 1 showed that the material was undamaged. The data in Tables 1 and 2 clearly indicate that no change in the filtration performance of the material took place in the course of the test.

EXAMPLE 2

A layered composite filter material of the invention was prepared as follows:

A porous expanded polytetrafluoroethylene film having a thickness of about 30 micrometers, and a pore volume of about 90 percent was used as the filter layer.

Spun-bonded non-woven polypropylene cloth, as described in Example 1, was used as the buffer layer.

A woven fabric, woven in both machine direction and transverse direction with monofilament polypropylene fibers was used as the support layer. The fabric was woven in a satin weave pattern and had an air permeability of 75 cc/cm$^2$/sec.

The material of the filter layer and buffer layer were laminated together to form an assembly. The layers were adhered using thermal fusion by passing them through the nip of a heated metal-surface roll and a silicone rubber-surface roll. The expanded polytetrafluoroethylene film of the filter layer contacted the heated roll surface. The heated roll was at a temperature of about 180° C., line speed was about 3 meters/minute, and the nip pressure was about 294 kPa (3 kg/cm$^2$). The distance between neighboring points of adhesion on the adhered surfaces of the filter layer and buffer layer was 0.2 millimeter on average, and in no case exceeded 0.5 millimeters. The adhesion strength between the filter layer and the buffer layer was about 150 g/3 cm-width. The laminated assembly was then joined and sealed at the edges to the support layer by flame bonding thus forming a layered composite filter material having a large region without interlayer adhesion between the buffer layer and the support layer.

We claim:

1. A composite filter material comprising layered material in the sequence of:

(a) a porous support layer of a woven or non-woven sheet of synthetic polymer fibers, (b) a porous buffer layer, more extensible and compressible than said support layer, of a non-woven sheet of synthetic polymer fibers, and (c) a filtration layer of porous polytetrafluoroethylene membrane;

said layers having adjacent surfaces in parallel laminar relationship;

said layers adhered by discrete separated primary and secondary bonds;

said primary bonds extending from said support layer through the full thickness of said buffer layer to said filtration layer so that all three layers are bonded together at a primary bond site, said primary bonds separated, one from another, by a distance not greater than 5 millimeters;

said secondary bonds formed only between and adhering the surfaces of adjacent layers, said secondary bonds sites located in the spaces between said primary bond sites and separated, one from another, by a distance not greater than 1 millimeter.

2. The composite filter material as recited in claim 1, wherein the synthetic polymer fibers of the support layer and buffer layer are polypropylene fibers, and wherein the porous polytetrafluoroethylene membrane is porous expanded polytetrafluoroethylene.

3. The composite filter material as recited in claim 1 wherein the layers are adhered by thermal fusion.

4. The composite filter material as recited in claim 2 wherein the layers are adhered by thermal fusion.

* * * * *